A. WILD.
GEARING FOR MIXING AND KNEADING MACHINES.
APPLICATION FILED APR. 9, 1917.
1,247,768.
Patented Nov. 27, 1917.
2 SHEETS—SHEET 1.
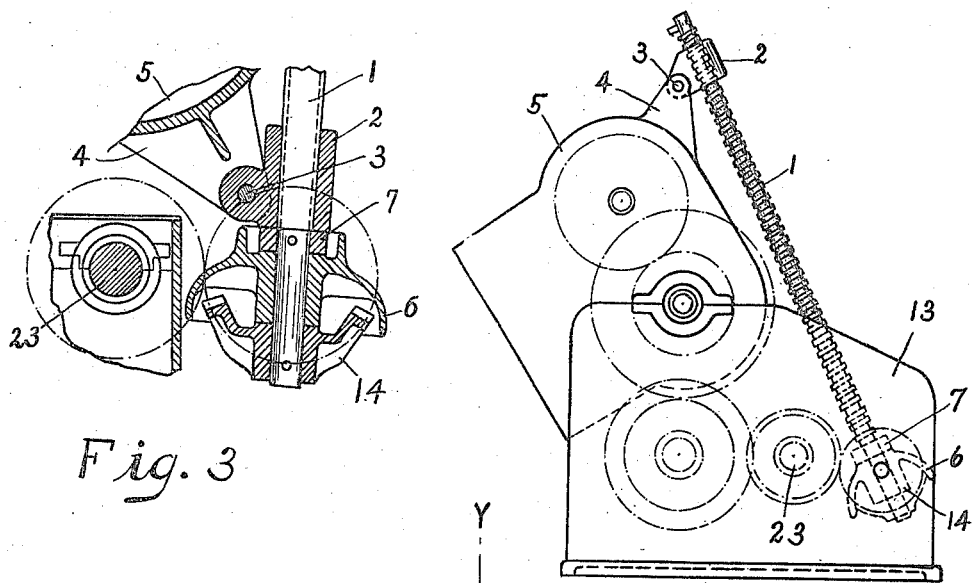
Fig. 3
Fig. 4
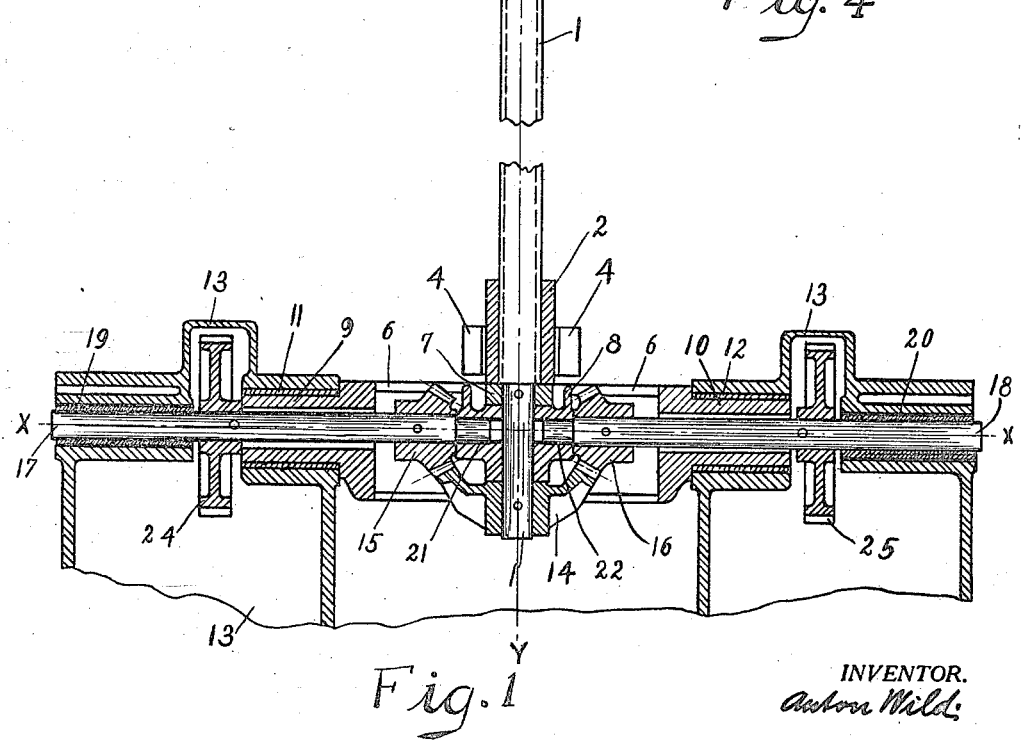
Fig. 1
INVENTOR.
Anton Wild.

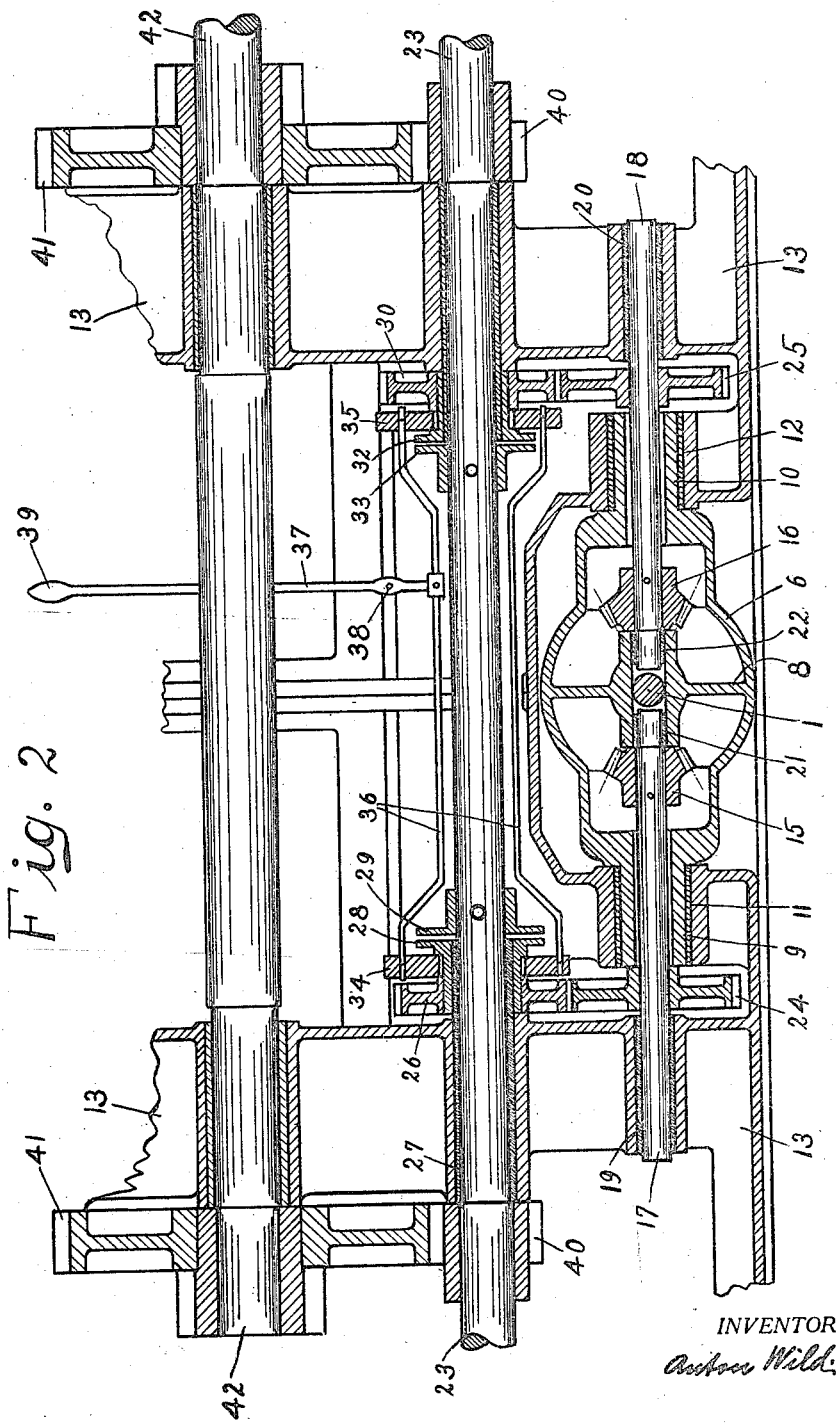

UNITED STATES PATENT OFFICE.

ANTON WILD, OF SAGINAW, MICHIGAN, ASSIGNOR TO WERNER & PFLEIDERER CO., INC., OF SAGINAW, MICHIGAN, A FIRM.

GEARING FOR MIXING AND KNEADING MACHINES.

1,247,768.        Specification of Letters Patent.      Patented Nov. 27, 1917.

Application filed April 9, 1917. Serial No. 160,839.

*To all whom it may concern:*

Be it known that I, ANTON WILD, a resident of Saginaw, in the county of Saginaw and the State of Michigan, have invented new and useful Improvements in Gearing for Mixing and Kneading Machines, of which the following is a specification.

My invention relates to improvements in mixing and kneading machines and particularly to that kind of machine in which the trough containing the mass under treatment is tilted by means of a screw arrangement for the ready product to drop into a receptacle placed underneath. The object of my invention is to provide novel and improved devices and novel and improved combinations and arrangements of the same for working the screw raising and lowering the trough in a more simple, efficient and economic manner than was possible to do by means of the arrangement and appliances used hitherto.

In the accompanying drawings Figure 1 is a longitudinal section of the mechanism forming the object of this invention, the trough being lowered to its working place, and the screw pointing vertically upward. Fig. 2 is a plan of the same mechanism on the line XX, and Fig. 3 its vertical cross section on the line YY of Fig. 1. Fig. 4 shows as example the sectional elevation of a complete machine in its tilted position.

1 is the rotatable tilting screw ending at its lower part in a circular, shaftlike rod, and 2 the female sleeve fitting to the screw 1 and hinged by the pin 3 and the bracket 4 to the bottom of the trough 5 of the machine. When the screw 1 is rotated in one direction, the sleeve 2 will travel upward thereon and thereby tilt the trough 5 to be emptied, and, when the screw 1 is rotated in the opposite direction, the sleeve 2 will travel downward thereon, and thereby lower the trough 5 into the working position of the machine. The screw 1 is supported by the hollow casing 6 open at the bottom and is held in position thereon by means of the collar 7 fixed to the former and resting on the latter. The casing 6 is provided in its middle part with the cross piece 8 in the center opening of which the lower shaftlike part of the screw 1 turns. In order to allow for the necessary play of the screw 1 in a plane vertical to the axis around which the trough 5 is tilted, the casing 6 is provided at opposite sides of the screw with the shaftlike projections 9 and 10 turning in the bearings 11 and 12 respectively arranged in the framework 13 supporting the machine and all its mechanisms. The lowest end of the screw 1 protruding from underneath the casing 6 is provided with the pinion 14 meshing at opposite sides with the pinions 15 and 16, the one being thus capable to turn the pinion 14 and its screw 1 in one direction, and the other in the opposite direction. Each of these pinions has a separate shaft the axis of which is parallel to that of the driving shaft 23 of the machine. The pinions 15 and 16 are fixed respectively to the shafts 17 and 18 passing through the hollow projections 9 and 10 of the casing 6 and rotatably supported at their outer ends by the bearings 19 and 20 arranged in the framework 13 of the machine and at the middle part of the mechanism by the bearings 21 and 22 provided in the cross piece 8 of the casing 6. Each of the shafts 17 and 18 is separately driven at will by any suitable means driven by the driving shaft 23 of the machine. This is done in the example represented in the drawings by gear wheels and clutch disk mechanism. The shaft 17 is provided with the gear wheel 24 fixed thereto between the bearing 19 and the hollow projection 9, and the shaft 18 with the gear wheel 25 between the bearing 20 and the hollow projection 10. The gear wheel 24 meshes with the gear wheel 26 fixed to the sleeve 27 turning around the shaft 23 and ending in the clutch disk 28 arranged parallel and opposite to the clutch disk 29 mounted on the shaft 23. The gear wheel 25 meshes with the gear wheel 30 fixed to the sleeve 31 turning around the shaft 23 and ending in the clutch disk 32 arranged parallel and opposite to the clutch disk 33 mounted on the shaft 23. The sleeve 27 is provided with the well fitting loose ring 34, and the sleeve 31 with the loose ring 35. These rings are rigidly connected with each other by means of the rods 36, to one of which the lever 37 is hinged. The lever arrangement for moving the rings 34 and 35 to and fro is constructed in the way usual in such cases. The lever 37 turning on the pivot 38 is worked by the handle 39.

In order to prevent the rings 34 and 35 from slipping to and fro on the sleeves 27 and 31 around which they turn respectively, the rods 36 connecting them are made of such length that these rings turn closely to the clutch disks 28 and 32 of the sleeves. The clutch disks 28 and 29 working the gear wheel 26 and the clutch disks 32 and 33 working the gear wheel 30 are arranged a very small distance apart, so that only a very small movement of the lever 37 to one side or the other is necessary to make them active, and the gear wheels 24 and 26 on the one side and 25 and 30 on the other side always remain in mesh, whether their respective clutches be engaged with each other or not. Any known means, for instance, springs or a weight, are used, to keep the lever 37 in the neutral position where none of the clutch disks is at work and the trough of the machine stationary.

The shaft 23 is provided with the gear wheels 40, 40 meshing with the gear wheels 41, 41 fixed to the shaft 42 driving the blades or agitators of the machine.

For tilting the machine the lever 37 is slightly pressed to the left, the disks 28 and 29 clutch, and the gear wheel 26 rotates with the driving shaft 23. The gear wheel 26 drives the gear wheel 24 on the shaft 17, the pinion 15 mounted on the latter drives the pinion 14 of the screw 1 which, thereby rotating to the right, causes its sleeve 2 to travel upward raising and tilting the trough 5 so that it empties itself. For lowering it again, the lever 37 if pressed to the right, the disks 32 and 33 clutch, and the gear wheel 30 rotates with the driving shaft 23. The gear wheel 30 drives the gear wheel 25 mounted on the shaft 18 and thereby the pinion 16 fixed thereto which on its part drives the pinion 14 of the screw 1. The latter is thereby rotated to the left and causes its sleeves 2 to travel downward, lowering the trough 5 to the working position of the machine.

The new tilting arrangement forming the object of this invention is especially adapted for those kneading and mixing machines in which the main driving shaft revolves in one direction only, as is now nearly always the case, the power being transmitted to the driving shaft by a direct coupled electromotor.

I claim:

1. In a tilting device for mixing and kneading machines, the combination with a driving shaft, of a rotatable screw ending at its lower part in a circular shaftlike rod, a casing rotatably supporting the said screw by its shaftlike end, and provided with shaftlike projections parallel to the above driving shaft and turning in bearings arranged in the framework of the machine, a pinion fixed to the screw rod, a female sleeve fitting to the said screw and hinged to the bottom of the trough of the machine, two shafts arranged parallel to the said driving shaft—one at each side of the screw—two pinions, one mounted on each shaft so as to mesh with the pinion fixed to the screw, and means for revolving from the above driving shaft either of these two shafts at will, the whole being so arranged, that when one shaft is revolved, the said screw is rotated in one direction causing the said sleeve to travel upward and tilting the trough, and, when the other shaft is revolved, the said screw is rotated in the opposite direction causing the said sleeve to travel downward and lowering the trough into the working position of the machine.

2. In a tilting device for mixing and kneading machines, the combination with a driving shaft, of a rotatable screw ending at its lower part in a circular, shaftlike rod, a collar attached to the upper portion of this shaftlike part, a casing, a cross piece arranged in the middle part thereof and provided with an opening for the said shaftlike end of the screw to pass through and turn in, the latter thus resting by means of its collar on the said casing, two shaftlike hollow projections arranged parallel to the above driving shaft at the casing—one at each side of the crosspiece—and turning in bearings provided in the framework of the machine, a pinion fixed to the lower end of the screw protruding from the said crosspiece of the casing, a female sleeve fitting to the said screw and hinged to the bottom of the trough of the machine, two shafts—one at each side of the crosspiece of the casing— arranged parallel to the driving shaft, passing through the hollow shaftlike projections of the casing and rotatably supported by bearings arranged at one end in the framework of the machine and at the other end in the crosspiece of the casing, two pinions— one mounted on each shaft so as to mesh with the pinion fixed to the screw end, and means for revolving from the above driving shaft either of the shafts at will.

3. In a tilting device for mixing and kneading machines, the combination with a driving shaft, of a rotatable screw ending at its lower part in a circular, shaftlike rod, a casing rotatably supporting the said screw by its shaftlike end, and provided with shaftlike projections parallel to the above driving shaft and turning in bearings arranged in the framework of the machine, a pinion fixed to the screwrod, a female sleeve fitting to the said screw and hinged to the bottom of the trough of the machine, two shafts arranged parallel to the said driving shaft—one at each side of the screw, two pinions—one mounted on each shaft so as to mesh with the pinion fixed to the screw, two gear wheels—one fixed to each shaft, gear wheels meshing with the same and rotatably mounted on the above driving shaft and means for connecting at will and for any time one of the said gear wheels to the said driving shaft, thus revolving the gear wheel meshing with the latter and the pinion mounted on the shaft at the side of the screw, the pinion fixed to the latter and thereby the screw itself.

4. In a tilting device for mixing and kneading machines, the combination with a driving shaft, of a rotatable screw ending at its lower part in a circular shaftlike rod, a casing rotatably supporting the said screw by its shaftlike end, and provided with shaftlike projections parallel to the above driving shaft and turning in bearings arranged in the framework of the machine, a pinion fixed to the screw rod, a female sleeve fitting to the said screw and hinged to the bottom of the trough of the machine, two shafts arranged parallel to the said driving shaft—one at each side of the screw, two pinions—one mounted on each shaft so as to mesh with the pinion of the screw, two gear wheels—one fixed to each shaft, two gear wheels meshing with the same, two sleeves—one for each of these latter gear wheels—serving as hubs for the same and turning around the above driving shaft, two clutch disks—one fixed to the end of each sleeve, two clutch disks adapted to engage with the latter and fixed to the said driving shaft, and means for engaging at will and for any length of time one or other of these pairs of clutch disks, thus fixing the sleeve of the engaged clutch disk to the driving shaft, rotating the gear wheel mounted on this sleeve with same, and thus revolving the gear wheel meshing with the latter and the pinion mounted on the shaft at the side of the screw, the pinion fixed to the latter and thereby the screw itself.

5. In a tilting device for mixing and kneading machines, the combination with a driving shaft, of a rotatable screw ending at its lower part in a circular shaftlike rod, a casing rotatably supporting the said screw by its shaftlike end, and provided with shaftlike projections parallel to the above driving shaft and turning in bearings arranged in the framework of the machine, a pinion fixed to the screw rod, a female sleeve fitting to the said screw and hinged to the bottom of the trough of the machine, two shafts arranged parallel to the said driving shaft—one at each side of the screw, two pinions—one mounted on each shaft so as to mesh with the pinion of the screw, two gear wheels—one fixed to each shaft, two gear wheels meshing with the same, two sleeves—one for each of these latter gear wheels—serving as hubs for the same and turning around the above driving shaft, two clutch disks—one fixed to the end of each sleeve, two clutch disks adapted to engage with the latter and fixed to the said driving shaft, two rings—one for each of the said sleeves—turning around the same between the clutch disk and gear wheel fixed thereto, rods connecting these two rings and a lever arrangement attached to one of these rods and adapted to engage at will one or the other pair of clutch disks.

6. In a tilting device for mixing and kneading machines, the combination with a driving shaft, of a rotatable screw ending at its lower part in a circular, shaftlike rod, a collar attached to the upper portion of this shaftlike part, a casing, a crosspiece arranged in the middle part thereof and provided with an opening for the said shaftlike end of the screw to pass through and turn in, the latter thus resting by means of its collar on the said casing, two shaftlike, hollow projections arranged parallel to the above driving shaft at the casing—one at each side of the cross piece—and turning in bearings provided in the framework of the machine, a pinion fixed to the lower end of the screw protruding from the said crosspiece of the casing, a female sleeve fitting to the said screw and hinged to the bottom of the trough of the machine, two shafts—one at each side of the crosspiece of the casing—arranged parallel to the driving shaft, passing through the hollow shaftlike projections of the casing and rotatably supported by bearings arranged at one end in the framework of the machine and at the other end in the cross piece of the casing, two pinions—one mounted on each shaft so as to mesh with the pinion fixed to the screw end, two gear wheels—one fixed to each shaft, two gear wheels meshing with the same, two sleeves—one for each of these latter gear wheels—serving as hub for same and turning around the above driving shaft, two clutch disks—one fixed to the end of each sleeve, two clutch disks adapted to engage with the latter and fixed to the said driving shaft, two rings—one for each of the said sleeves—turning around the same between the clutch disks and gear wheel fixed thereto, rods connecting these two rings, and a lever arrangement arranged at one of these rods and adapted to engage at will one or the other pair of clutch disks.

ANTON WILD.

Copies of this patent may be obtained for five cents each, by addressing the "Commissioner of Patents, Washington, D. C."